A. H. KUNZE.
QUACK GRASS DIGGER.
APPLICATION FILED APR. 11, 1918.

1,283,811. Patented Nov. 5, 1918.

WITNESSES:

INVENTOR.
Adam H. Kunze
BY Brown & Nissen
ATTORNEYS.

UNITED STATES PATENT OFFICE.

ADAM H. KUNZE, OF BELOIT, WISCONSIN.

QUACK-GRASS DIGGER.

1,283,811.

Specification of Letters Patent.

Patented Nov. 5, 1918.

Application filed April 11, 1918. Serial No. 227,842.

*To all whom it may concern:*

Be it known that I, ADAM H. KUNZE, a citizen of the United States, residing at Beloit, in the county of Rock and State of Wisconsin, have invented certain new and useful Improvements in Quack-Grass Diggers, of which the following is a specification.

My invention relates to quack grass diggers, and has for its object the provision of a simple and efficient device of the character mentioned. Other objects will appear hereinafter.

An embodiment of my invention is shown in the accompanying drawing, forming a part of this specification, and in which—

Figure 1:
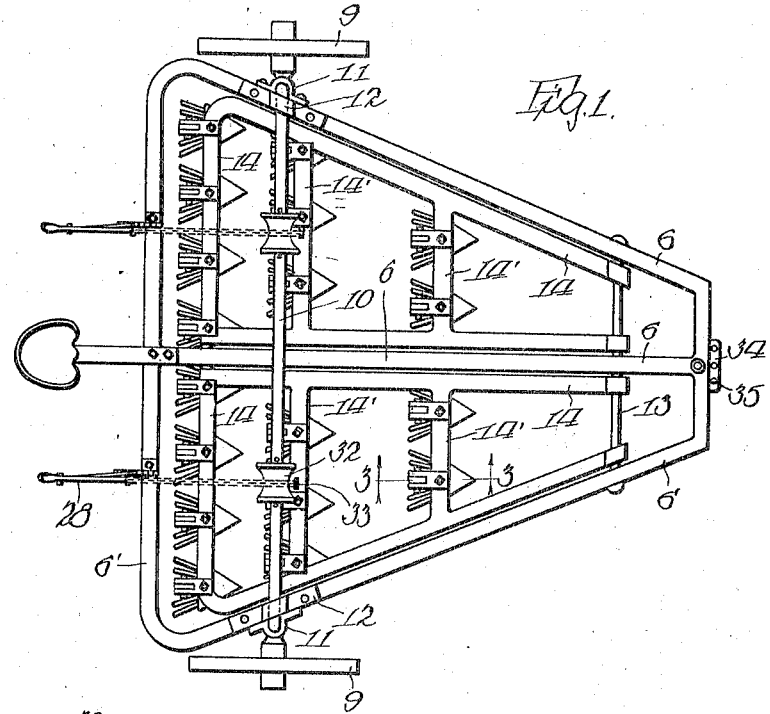
Figure 1 is a plan view of the device embodying my invention.
Figure 2:
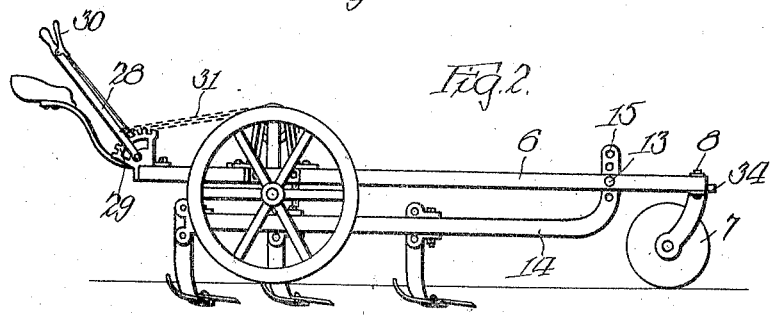
Fig. 2 is a side elevation of the same.

Referring more particularly to the drawing, I have shown a frame 6 substantially triangular in form, but it will be understood that any other desirable shape may be given to the frame when so desired. The frame 6 is preferably mounted on ground wheels, and any number of ground wheels may be used desirable. I find that three wheels make a very convenient arrangement. In such a construction I preferably provide a single front wheel 7 of the caster wheel type pivoted as at 8 to the front end of the frame. At the rear of the machine I provide two ground wheels 9 which may be of larger size than the front wheel 7. I mount the wheels 9 on an axle 10, and in order to have the inner opening of the frame 6 unobstructed, I preferably offset the axle 10 upwardly, as clearly indicated in Figs. 1 and 2. This gives sufficient room under the axle for swinging the blade frames described later. The axle 10 is secured to the frame 6 in a suitable manner such as by members 11 attached to the edges of the frame 6, and the upright portions of the axle 10 and base members 12 secured to the upper horizontal portion of the axle and the top of the frame 6, as clearly indicated in the drawing. This forms a rigid and strong connection between the axle and the frame.

Figures 3, 4:
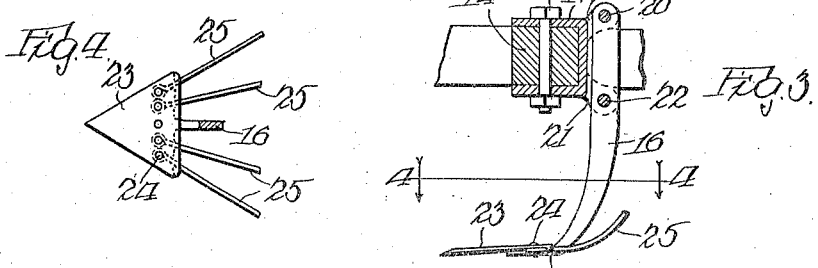
Fig. 3 is an enlarged section taken on line 3—3 of Fig. 1.
Fig. 4 is a section taken on line 4—4 of Fig. 3.
Figure 5:
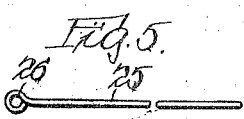
Fig. 5 is an enlarged plan view of an arm used in the construction.

Across the front part of the frame, as near the front wheel 7 as practical, I mount a rod 13 which serves as the pintle for the blade frames 14. The blade frames 14 are preferably bent upwardly at their front ends and provided with a plurality of openings 15 therein so that the rod 13 may be engaged in the different holes 15 to set the frames 14 to operate at different heights and so that the digging elements will operate at different depths in the ground. The frames 14 are each preferably made up having cross bars 14' therein. I have shown these frames as having two intermediate cross bars and a rear cross bar 14', but it will be understood that as many cross bars may be inserted as desirable. On each of the cross bars I secure one or more blade-holding shanks 16. The shanks 16 may be secured to the cross bars 14' in any desirable manner. I have found that a convenient arrangement is a casting 17 which fits around on three sides of a cross bar 14' with a bolt 18 passing through the casting and cross bar, as clearly indicated in Fig. 3. The shank 16 is preferably pivoted to an ear 19 on the casting 17 on an iron bolt or pin 20. In order to prevent the shank 16 from rotating about the pin 20, I provide an ear 21 on the casting 17 and a wooden or other breakable pin 22 in the ear and a suitable portion of the shank 16 so that when a sudden strain comes on the shank such as by engaging a root or large stone, the pin 22 will be broken permitting the shank 16 to swing backwardly and prevent breaking some other part of the device. When a pin 22 has been broken it is only necessary to raise the frame 14 on which the broken pin is mounted and swing the shank 16 back to its position indicated in Fig. 3 and put in a new wooden pin 22.

On the bottom of each shank 16 I provide a cutting blade 23 which can be secured to the bottom of the shank 16 in any desirable manner such as by a bolt 24. The blades 23 should lie as nearly in a horizontal plane as possible, for in this position less force is required to propel the device along, and also the ground is distorted less than if the blade 23 is set at a steep angle. I find, however, that in order to keep the blade 23 into the ground it is desirable to set it at a small angle, which might be such an angle that the front end of the blade is about half an inch lower than the rear edge. However, this will vary according to the hardness of the ground. Spaced from the rear edge of each blade 23 I provide a plurality of holes and an arm 25 extending backwardly and upwardly, preferably in a gentle curve from each of said holes. The arms 25 may be of rods, or any other desirable material, each having an eye 26 at its forward end, which is secured to one of the holes along the rear of the blade 23 by a suitable bolt, such as the bolt 24 in Fig. 3. In order to prevent the arms 25 from rotating about the bolts holding them in place on the blades 23, I provide depending lugs 27 along the rear edge of the blades between the arms 25 and shank 16 so that the ends of such depending lugs engage the arms and shank holding the blade in proper position, and the arms 25 against rotation.

The frames 14 are pivoted independently on the rod 13 and each provided with means independent of the other for raising its rear portion in order to raise the device up out of the ground for transportation, or whenever desirable. A suitable means for raising each of the frames 14 is a lever 28 mounted on the rear portion of the frame 6 with a quadrant 29 which is engaged by suitable pawl mechanism 30 on the lever to hold the lever against accidental displacement. Extending from each lever 28 is a chain 31, or its equivalent, which passes over a pulley 32 on the axle 10 and thence downwardly and attached to a frame 14 as at 33 in Fig. 1. With this arrangement by moving each lever 28 one of the frames 14 may be raised and lowered as desired.

Any suitable power may be used to propel the device. An ear 34 is provided on the front end of the frame 6 with a plurality of perforations 35 therein to which the power may be attached.

In the operation of the device it is drawn over the ground after the latter has been plowed and the cutting blades 23 moved along a few inches under the top of the ground. These blades loosen up the grass which has been covered and as the blades pass through the grass, the arms 25 raise this grass to the top of the ground. The grass can then be taken up by a rake, not shown, or other tool.

While I have illustrated and described the preferred form of my invention, I do not desire to be limited to the precise details set forth, but desire to avail myself of such variations and changes as come within the scope of the appended claims.

I claim:—

1. A quack grass digger comprising a frame; a flat blade carried by said frame in position to lie below the surface of ground to be treated; and a plurality of fingers extending rearwardly from said blade and having their rear portions bent upwardly about centers of curvature above said fingers so that said fingers lie in a surface concave on its upper side and having portions thereof in lines perpendicular to the direction of movement of said blade all at substantially the same height, the rear ends of said fingers terminating in transversely alined upwardly projecting prongs.

2. A quack grass digger comprising a frame arranged to be drawn over infested ground; a shank extending downwardly from said frame to a point below the surface of the ground; a tri-angularly-shaped flat blade carried by said shank in a substantially horizontal plane below said surface with one apex of said blade pointed forwardly; and a plurality of fingers extending rearwardly from the rear edge of said blade and radially relative to the forward point thereof, the portions of said fingers adjacent said blade lying substantially in the plane of said blade while the rear portions thereof are curved upwardly about centers of curvature above said fingers, the curved portions of said fingers being so related that said fingers are in horizontal alinement with one another along lines transverse to the direction of movement of said blade, and the relative lengths of said fingers being such that the fingers all terminate in upwardly projecting prongs extending slightly above the surface and alined with one another in a direction transverse to the direction of movement of said blade.

In testimony whereof I have signed my name to this specification on this 6th day of April A. D. 1918.

ADAM H. KUNZE.

Copies of this patent may be obtained for five cents each, by addressing the "Commissioner of Patents, Washington, D. C."